United States Patent [19]

Fung et al.

[11] 4,131,721

[45] Dec. 26, 1978

[54] ELECTROLYTIC CELL HAVING A NOVEL ELECTRODE INCLUDING PLATINUM ON A CARBON SUPPORT ACTIVATED WITH A PHOSPHORUS-OXYGEN-CONTAINING COMPOUND

[75] Inventors: Shun C. Fung, Edison; Yen-Chi Pan, Westfield, both of N.J.

[73] Assignee: Electric Power Research Institute, Inc., Palo Alto, Calif.

[21] Appl. No.: 807,523

[22] Filed: Jun. 17, 1977

[51] Int. Cl.$^2$ ............................................. H01M 8/08
[52] U.S. Cl. ........................................ 429/13; 429/44
[58] Field of Search ........................ 429/13, 44, 40, 46

[56]  References Cited
U.S. PATENT DOCUMENTS 2,275,281  3/1942  Berl ........................................ 429/44
3,287,171  11/1966  Holt ........................................ 429/44
3,912,538  10/1975  Dews ...................................... 429/44
4,017,664  4/1977  Breault ................................... 429/44

Primary Examiner—Anthony Skapars
Attorney, Agent, or Firm—Flehr, Hohbach, Test, Albritton & Herbert

[57] ABSTRACT

A novel electrolytic cell is described which contains an anode electrode and a cathode electrode, each being adapted for contact with an electrolyte. At least one of the electrodes includes platinum on a carbon support activated with a phosphorus-oxygen-containing compound. A preferred electrolytic cell of the present invention comprises a fuel cell having phosphoric acid as its electrolyte. Also disclosed is a method of directly producing electrical energy using the electrolytic cell described.

15 Claims, 2 Drawing Figures

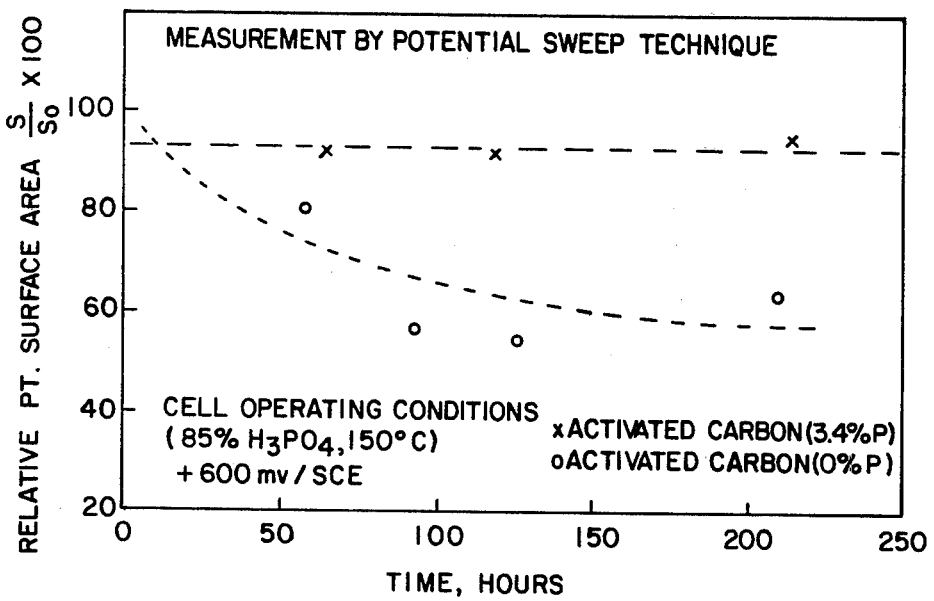
FIG.—1
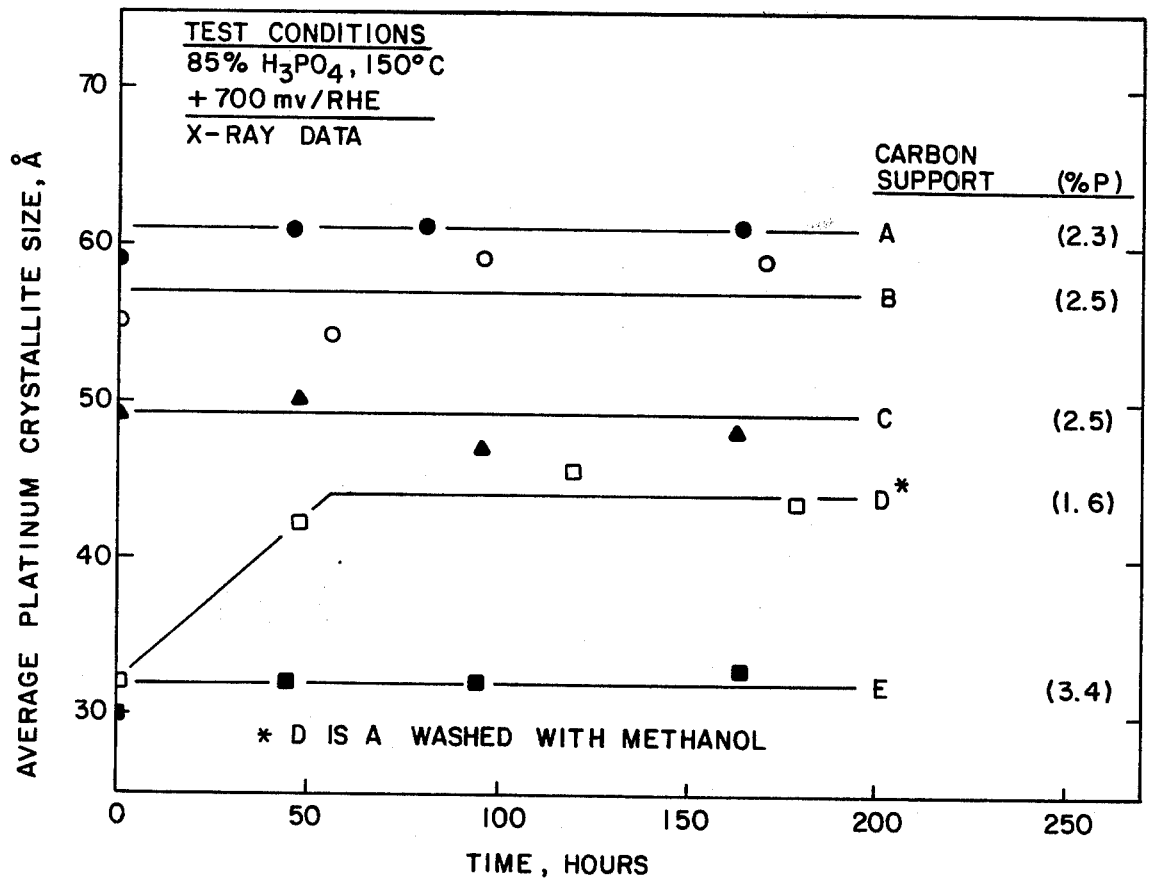
FIG.—2

ELECTROLYTIC CELL HAVING A NOVEL ELECTRODE INCLUDING PLATINUM ON A CARBON SUPPORT ACTIVATED WITH A PHOSPHORUS-OXYGEN-CONTAINING COMPOUND

BACKGROUND OF THE INVENTION

The present invention relates to novel electrolytic cells and more particularly to such cells containing at least one electrode having platinum on a carbon support activated with a phosphorus-oxygen-containing compound. The present invention is also directed to a method of direct production of electrical energy using such cells.

In electrolytic cells, electro-catalyst electrode structures are employed to catalyze the electrochemical reaction necessary to produce electrical energy. For example, in a fuel cell, a fuel such as hydrogen, or a mixture of gases containing hydrogen in which hydrogen is the active constituent, is directly converted in a potentially low-cost process to electrical energy as a result of catalysts contained within the fuel cell. Such cells contain, for example, finely divided platinum at either the anodic or cathodic electrodes of the cell or at both electrodes of the cell.

One highly efficient type of cell employs platinum as the cathode electro-catalyst, phosphoric acid as electrolyte, and operates at elevated temperatures of up to, for example, 190° C. However, a serious problem in using a supported platinum electro-catalyst in that environment, as well as other corrosive or acidic environments, is that the metal crystallites tend to coalesce with a consequence of significant reduction in its surface area over long term use. This has been known to reduce the catalytic activity to a great degree and significantly reduce useful fuel cell life. Such surface area loss is performance limiting in the cathode compartment where the electrocatalyst is employed. Of course, in those cells wherein the platinum is employed at only the anode or at both the cathode and anode, corresponding performance loss will occur. That is, in such cells, if it were not for this loss in catalytic activity, the fuel cell would have a much longer useful life.

The prior art is replete with teachings concerning various types of electro-catalyst systems for electrolytic cell electrodes and many catalytic materials have been suggested, including noble metals in addition to platinum, as well as various complexes of some of these. British Pat. No. 1,418,943 (Siemens Aktilngesellschaft), describes the use of various metal phosphide catalysts but nowhere teaches the use of platinum on phosphorus-oxygen-containing compound activated carbon supports. Various substitutes for platinum catalysts have been proposed. For example, in U.S. Pat. No. 3,449,169 (D. R. Rhodes), platinum phosphide has been suggested as an unsupported electro-catalyst primarily for use in the anode compartment. However, there is no suggestion that this compound could be supported or used in that state to prevent surface area losses. Unsupported platinum has far less surface area and thus, lower catalytic activity, than platinum on a high surface area support.

SUMMARY OF THE INVENTION

A novel electrolytic cell is described which contains an anode electrode and a cathode electrode each being adapted for contact with an electrolyte. At least one of the electrodes includes platinum on a carbon support activated with a phosphorus-oxygen-containing compound. A preferred electrolytic cell of the present invention comprises a fuel cell having phosphoric acid as its electrolyte. Also disclosed is a method of directly producing electrical energy using the electrolytic cell described.

DETAILED DESCRIPTION OF THE PRESENT INVENTION

The present invention is directed to both an electrolytic cell and a method of producing electrical energy using that electrolytic cell. An important aspect of the cell and method of the present invention involves the use of at least one electrode which includes platinum on a carbon support activated with a phosphorus-oxygen-containing compound. Thus, while the electrolytic cell of the present invention may be any of those known in the prior art, particularly the well known fuel cells, it is essential to the present invention that such cells contain at least one electrode as mentioned. Typically, these electrolytic cells will comprise an anode electrode and a cathode electrode and each may optionally extend into separate compartments. Further, each will be adapted for contact with an electrolyte. The particular design or physical arrangement of the electrolytic cell of the present invention is not critical and such design is one of choice.

In general, the supported platinum electro-catalyst used in the cell and method of the present invention includes finely divided platinum crystallites which are dispersed on support particles of high surface area carbon which has been activated with phosphorus-oxygen-containing compounds. In the prepared electro-catalyst, the size of the platinum crystallites are generally below 100 angstroms, and are in the range of about 20 to about 60 angstroms. Also, after hundreds of hours of use as an electro-catalyst in a fuel cell containing a phosphoric acid electrolyte, when operated at an elevated temperature, e.g. 150° C., and at, for example, +700 mv/reversible hydrogen electrode (RHE), the crystallite size is stabilized against surface area loss and is characterized in general by a platinum crystallite size which varies less than 10% from the original particle size.

Thus, it has unexpectedly been discovered that the phosphorus-oxygen-containing compound in the carbon support particles serves as a trap-site or agent which immobilizes the platinum crystallites and prevents coalescence when the foregoing supported platinum electro-catalyst is employed as in an electrolytic cell, e.g. as the cathodic electrode of a fuel cell. It is believed that any phosphorus-oxygen-containing compound which functions similarly to phosphoric acid may be used in method of the present invention. However, it is believed that the particular compounds $P_2O_5$ and especially the preferred compound phosphoric acid are advantageous. The amount of phosphorus required to impart surface area stability to the platinum crystallites is believed to be dependent upon a number of variables including the available surface area of the carbon support particles, the level of platinum loading, and the electrochemical conditions in the particular electrolytic cell, e.g. whether or not phosphoric acid or other harsh environment is involved. It has been found that stability against surface area loss is imparted with the mentioned compounds when used in excess of about 1% by weight of phosphorus based on the total weight of the carbon support. It is preferred to use at least 2% by weight of phosphorus based on the weight of the carbon support.

As mentioned, suitable support particles for the present invention are finely divided carbon, preferably of high surface area. This carbon is activated, as mentioned, with a phosphorus-oxygen-containing compound and may be purchased commercially in its activated state, or may be activated prior to use in the present invention. Excellent stability has been obtained with activated carbon of a surface area having approximately 1,000 to about 2,000 square meters/gram and a phosphorus level of about 2.3 to about 3.4% based on the weight of the carbon support. The physical properties and the phosphorus level of a variety of such activated carbon supports treated with phosphoric acid and identified by their trade names are set forth in the following Table 1:

TABLE 1

| Carbon Support | BET Surface Area, $m^2/gm$ | P Content (Wt. %) |
|---|---|---|
| North American P-100 | 1400 | 3.4 |
| North American P-100 (Triple Methanol Washed) | 1471 | 1.56 |
| Westvaco Nuchar | 1500 | 2.5 |
| American Norit (Polycarbon C) | 1000 | 2.5 |
| North American P-108 | 1764 | 2.5 |

It is noted that the phosphorus content in the foregoing carbon support particles is achieved by the deposition of the phosphorus-oxygen-containing compound during the commercial manufacture of such particles. As mentioned, an alternative approach would involve the deposition of such compounds onto unactivated carbon prior to use in the present invention. In either case, it has been discovered that the initial presence of the phosphorus-oxygen-containing compound in the activated carbon support unexpectedly stabilizes deposited platinum crystallite in electrolytic cell applications, e.g. fuel cell applications.

A number of techniques may be employed for forming the desired platinum crystallites on the surface of the foregoing phosphorus-oxygen-containing compound activated carbon support particles. In general, the platinum is deposited in ionic form onto the carbon support so as to obtain the platinum crystallites. Platinum ion deposition may be performed by any of a number of techniques. One preferred technique is to deposit the platinum in ionic form by impregnation with chloroplatinic acid solution. This technique referred to herein as "impregnation", is generally described in Sinfelt, J. H., J. Catalysis 29, 30 (1973). Another suitable technique for the deposition of platinum onto the phosphorus-oxygen-containing compound activated carbon support is the use of well known ion exchange methods. Thus, the platinum may be deposited from a platinum amino complex such as $Pt(NH_3)_4Cl_2$. A suitable procedure is set forth in Furuoya,I. and Shirasaki,T., *Bull. Japan Pet. Institute*, 13, 78 (1971).

Subsequently, the platinum in the electro-catalyst must be activated. For example, the electro-catalyst may be treated by a reduction process, or, as an alternative, a calcining technique may be used. One preferred approach involves reduction. An alternative preferred approach involves reduction followed by calcination. When reduction is used, any one of the conventionally known reduction techniques may be employed. For example, one technique which has been found to be suitable for the supported platinum electro-catalyst formed by impregnation comprises the steps of hydrogen reduction for 1.5 hours at 450° C. with a flowing de-oxygenated and dry hydrogen gas stream at elevated temperatures which may be followed by heating in air at, for example, 220° C. Of course, the mentioned temperatures are not critical to the present invention and variations thereof would be obvious to the artisan. As another example, whether the electro-catalyst is prepared by ion exchange or by impregnation, hydrogen reduction alone may be employed. The mentioned techniques are applicable for the deposition of platinum at the levels desired for electrolytic cell systems. Thus, platinum may be deposited at levels as low as about 5% to as high as about 25% or even more based upon the weight of the carbon support articles.

As mentioned above, a critical aspect of the present invention is the use of at least one electrode containing the described electro-catalyst. In general, the electrodes formed with these electro-catalysts may be prepared by known techniques. Thus, for example, the electrodes may be prepared on a metal screen such as a gold screen, using polyetrafluoroethylene as a binder. Alternatively, solid conductive particles, e.g. graphitized carbon, may be mixed with the electro-catalyst and binder prior to being pressed onto a screen. Such electrodes are particularly suited for long term use as cathode electrodes in electrolytic cells such as fuel cells, although they may also be used as anode electrodes. This is especially true in the fuel cells employing phosphoric acid electrolytes. An example of one type of fuel cell in which these electro-catalysts may be employed involves the use of 85% phosphoric acid electrolyte having commercial operation at +700 mv/RHE or the equivalent +600 mv/SCE (Standard Calomel Electrode).

The present invention is more fully understood by reference to the following examples. However, it should be understood that these examples are presented for illustrative purposes only and the invention should not be construed to be limited thereto.

DRAWINGS AND EXAMPLES

Electrochemical tests on the electrocatalyst of the present invention were carried out on the following type of cell. A typical test cell consists of a cylindrical polyetrafluoroethylene fixture containing approximately 250 ml of electrolyte (85% phosphoric acid solution), three electrodes, and a thermometer. The working electrode contains the test electro-catalyst pressed on a 1.7 cm square gold screen. A high density graphite rod serves as the counter electrode, and a Luggin capillary with saturated calomel electrode (SCE) serves as the reference electrode. The working electrode is potentiostated to the particular desired test conditions. The desired reactant atmosphere is maintained over the electrolyte and working electrode; the reactant flow exits through a reflux condensor to maintain electrolyte concentration.

FIG. 1 is a graph of relative platinum surface area to time as measured by a potential sweep technique performed by the triangular potential sweep method, using a Princeton Applied Research Model 175 Universal Programmer and Model 173 Potentiostat. The cell operating conditions employed the use of an 85% phosphoric acid electrolyte, 150° C. temperature and +600 mv versus a standard calomel electrode. The series of points illustrated by x's comprised platinum deposited onto activated carbon containing 3.4% phosphorus, supplied under the designation North American P-100. Approximately 10% platinum was deposited by the impregnation technique. This electro-catalyst was mixed in a 1:1 weight ratio with uncatalyzed, conductive graphite. As illustrated in FIG. 1, the relative platinum surface area remained well in excess of 90% of the original surface area during sintering for 200 hours.

Referring again to FIG. 1, in contrast to the above results, the same test was performed with another activated carbon electro-catalyst including essentially no phosphorus. This product was formed by impregnating platinum onto the surface of an activated carbon supplied under the name Vulcan XC-72. It is apparent that after about 100 hours, the relative platinum surface area was reduced to approximately 60% with a corresponding loss in catalyst activity. This illustrates the importance of phosphorus as a trap-site or agent to immobilize the platinum and impede coalescence.

A further illustration of the importance of using a phosphorus-oxygen-containing compound activated carbon support to impede coalescence of platinum crystallites is illustrated in FIG. 2. The carbon supports designated A-E are formed by platinum deposition at 10 weight % onto a variety of activated carbons and subsequent reduction of the same. Such code designations refer to the following commercially available carbon supports.

| Designation | Brand Name |
| --- | --- |
| A | North American P-108 |
| B | Westvaco Nuchar |
| C | American Norit Polycarbon C |
| D | North American P-100 (Washed three times in methanol) |
| E | North American P-100 (Unwashed) |

The importance of the presence of phosphorus in the carbon support to stabilize the platinum crystallites in a phosphoric acid fuel cell are illustrated in the graph of FIG. 2. Thus, comparing Sample D and E, it is apparent that at 3.4% phosphorus, the platinum crystallites are fully stabilized while at 1.6% phosphorus, they are far less stable. However, it should be noted that even the 1.6% phosphorus containing compound is far more stable than the activated carbon containing no phosphorus as illustrated in FIG. 1. It should be noted that while the starting electro-catalyst contains phosphorus-oxygen-containing compound activated carbon supports, it is not understood what changes, if any, occur during the use of the catalyst. That is, it is not necessarily true that after prolonged usage of the electro-catalyst, the phosphorus-oxygen-containing compound remains unaffected.

To further illustrate the enhanced performance of cells of the present invention, a comparison of the electrochemical performance of oxygen reduction between activated and unactivated carbon supports with platinum crystallites was made. The results are shown in Table 2.

TABLE 2

Comparison of Electrochemical Performance of Oxygen Reduction Between Activated and Unactivated Carbon Supports

| | Current (mA/cm$^2$)[1] | |
| --- | --- | --- |
| Electrode Potential (Volts/RHE) | Platinum$_2$On P-100[2] | Platinum On XC-72[3] |
| 0.85 | 10 | 4.0 |
| 0.80 | 21 | 7.7 |
| 0.75 | 35 | 13 |
| 0.70 | 53 | 20 |
| 0.65 | 70 | 26 |

[1] 15 wt.% Teflon bonded electrodes tested at 150° C. with 85% phosphoric acid electrolyte.
[2] Platinum on P-100 (H$_3$PO$_4$ activated carbon) mixed with graphitized carbon (2.4 mgs. platinum/cm$^2$).
[3] Platinum on XC-72 (unactivated carbon black) using more platinum (3.1 mgs platinum/cm$^2$).0413172101201

What is claimed is:

1. An electrolytic cell comprising an anode electrode and a cathode electrode each being adapted for contact with an electrolyte, at least one of said electrodes including an electrocatalyst comprising platinum on a carbon support, said support including at least 1% by weight of phosphorus.

2. The cell of claim 1 in which said carbon support has a high area comparable to that of activated carbon.

3. The cell of claim 1 in which said phosphorus is dispersed in said carbon support by deposition contact with a phosphorus-oxygen-containing compound.

4. The cell of claim 3 wherein said phorphorus-oxygen-containing compound is selected from the group consisting of p$_2$O$_5$ and H$_3$PO$_4$.

5. The cell of claim 3 wherein said phosphorus-oxygen-containing compound is H$_3$PO$_4$.

6. The cell of claim 1 comprising a fuel cell for the direct production of electrical energy from a fuel.

7. The cell of claim 1 in which said platinum is in elemental form.

8. The cell of claim 6 further including an electrolyte comprising phosphoric acid.

9. In a method for the direct production of electrical energy from an electrolytic cell comprising an anode electrode and a cathode electrode, in which each electrode is in contact with an electrolyte whereby electrical energy is produced, the improvement comprising:
providing an electrocatalyst for at least one of said electrode comprising platinum on a carbon support, said support including at least 1% by weight of phosphorus.

10. The method of claim 9 in which said carbon support has a high surface area comparable to activated carbon.

11. The method of claim 9 in which said platinum is in elemental form.

12. The method of claim 9 in which said phosphorus is dispersed in said carbon support by deposition contact with a phosphorus-oxygen-containing compound.

13. The method of claim 12 wherein said phosphorus-oxygen-containing compound is selected from the group consisting of P$_2$O$_5$ and H$_3$PO$_4$.

14. The method of claim 13 wherein said phosphorus-oxygen-containing compound is H$_3$PO$_4$.

15. The method of claim 9 wherein said cell comprises a fuel cell.

* * * * *